United States Patent Office 2,708,165
Patented May 10, 1955

2,708,165

FOOD COMPOSITIONS

Paul György, Villanova, Pa., Richard Kuhn, Heidelberg, Germany, and Hans W. Ruelius, Philadelphia, Pa., assignors, by mesne assignments, to American Home Products Corporation, New York, N. Y., a corporation of Delaware No Drawing. Application April 22, 1952,
Serial No. 283,772

2 Claims. (Cl. 99—54)

This invention relates to food products and, more particularly, to food products which are suitable for use in the feeding of infants.

Our invention is more especially concerned with certain new and improved food compositions which contain the usual fat, protein, carbohydrate, fatty acid, amino acid, vitamin and mineral constituents necessary for growth of the infant, but which compositions also contain, in addition, an added substance supplying a specific factor or principle necessary to support the growth of the microorganism *Lactobacillus bifidus* as the predominant microorganism in the digestive tract of the infant fed therewith.

There are a number of commercially available food compositions utilized for the feeding of infants which are based on cow's milk as an essential and important nutritive constituent thereof. These compositions generally contain, in addition to added vitamins, a fat constituent, a milk protein, an edible sugar (frequently lactose), minerals, and ash. The relative proportion of these constituents is such as to provide a nutritive formula meeting all the nutritional requirements of the infant when an aqueous solution of a specified concentration is prepared and fed to the infant.

As an example, one well-known commercially available infant feeding formula, derived from cow's milk but having major physical and chemical properties essentially the same as human milk, contains approximately 1.5% of protein, 7.0% of carbohydrate, 3.5% of fat, 0.38% of ash and a mineral constituent, such as iron, present in a relatively minor amount as, for example, approximately 0.0005%, as the food is made up as a liquid ready to feed to the infant. Such a composition is, in many respects, similar to human milk, will supply approximately 20 calories per fluid ounce, and contains of course, in addition, various vitamin constituents, such as vitamin A, thiamin, riboflavin, vitamin C, vitamin D and niacin, all present (with the exception of vitamin C) in amounts considerably in excess of the amounts in which those vitamins are present in an equal volume of human or breast milk.

It should be understood, of course, that the particular commercial food composition having the foregoing analysis is but one of many available infant feeding formulas, all based on, or derived from, cow's milk, which compositions are usually supplied, either in a concentrated liquid form which is adapted to be diluted with water before use, or as a solid powder or granular composition which is dissolved in water in specified proportions to provide solutions of specified concentrations. Such compositions will vary to some extent from each other in the ingredients utilized, i. e., the source of the fat present therein, the content of saturated and unsaturated fatty acids and amino acids, the carbohydrate constituents, the relative proportions of the ingredients, etc., but they are essentially similar in that all are derived from the milk of cows.

While some of these commercially available infant food compositions are similar to human milk, to greater or less degree, in their major physical and chemical properties, there are, however, certain important differences in the predominating microorganisms present in the intestinal bacterial flora characteristic of an infant fed exclusively with human or breast milk, as compared with the intestinal flora of an infant who is fed with one of the commercial food formulas based on, or derived from, cow's milk. The intestinal flora of the breast fed infant is characterized by the presence therein of the microorganism *Lactobacillus bifidus* as the predominating microorganism. The stools of infants who have been fed exclusively with human milk are in fact remarkable in that this microorganism comprises practically the entire bacterial flora present in the excretions.

As seen in smears when freshly isolated from the infant feces the *L. bifidus* organism appears as gram-positive, straight or curved rods that are non-motile and that do not form spores. One or both ends may appear to be split longitudinally to give the effect of two short branches, this appearance leading to the term "bifid." One end of the organism may be bulbous or racket-shaped.

While this microorganism predominates in the intestinal tract and feces of infants fed with human milk from lactating mothers, it is not the characteristic of predominating microorganism in the intestinal tract of infants fed with other foods, such as cow's milk, or with the commercially available food preparations derived from, or based on, cow's milk. Infants so fed show a less uniform intestinal flora with an appreciable proportion of gram-negative rods and cocci.

The fact that a stable *L. bifidus* flora is characteristic only of the intestinal tract of breast-fed infants is now fully understood and appreciated by pediatricians and other specialists in the medical, biological, and nutritional sciences. See, for example, the publications of Tissier, Comptes rendus soc. biol., 51, pages 943–945; and 60, pages 359–361; and Ann inst. Pasteur, 19, pages 109–123; and 22, pages 189–207. See also the papers of Moro; Wein, kiln, Wochschr.; 13, pages 114–115, and Jahrb. Kinderheilk., 61, pages 676–734; and 61, pages 870–899. That the original observations of Tissier concerning the predominance of *L. bifidus* in nurslings' stool have been amply confirmed is pointed out in the more recent publication of Norris, Flanders, Tomarelli, and Gyorgy in the Journal of Bacteriology, 60, pages 681–696 (December 1950).

Medical authorities are now in general agreement that many of the advantages which a breast-fed infant seems to have, in so far as its nutrition and resistance to certain diseases are concerned, are attributable, at least in part, to the predominance of *L. bifidus* in his intestinal tract. The prevalence of this organism in the intestinal tract is now believed to be of physiological significance, and its growth may prevent intestinal disorders caused by other bacteria. Resistance to bacterial intestinal diseases, and even to parenteral disorders, such as respiratory infections, is typical of breast-fed infants. Infants who are bottle-fed with the milk of cows and other animals, or with infant feeding formulas utilizing cow's milk as the source of protein, are definitely more susceptible to such disorders. In this connection see the article of Robinson in "Lancet," entitled: "Infant Morbidity and Mortality," vol. CCLX, page 788 (April 7, 1951).

In the infant colon in which a stable *L. bifidus* flora is lacking it is now generally believed that the infant is more likely to suffer from disorders attributable to the growth of other bacteria, some of which are harmful to the infant, since competition for the available food supply in the infant intestinal tract where *L. bifidus* flourishes reduces the possibility that other bacteria, particularly the harmful *B. coli.*, may grow in considerable numbers or in extensive colonies. In any event, where the gram-positive bacillus *L. bifidus* is present in large numbers in the infant intestine, which is now found only when the infant is breast-fed, there is considerably less growth of other microorganisms, particularly of the gram-negative *B. coli.*, the Clostridia, and certain air-borne microorganisms such as the Sarcinae bacteria. While the reasons for the superior resistance to disease of breast-fed infants as compared with infants who are fed on cow's milk, or on the usual infant formulas in which cow's milk is a principal constituent, are not fully understood, pediatricians are generally agreed that in some measure, at least, the superior resistance is attributable to the presence of an extensive *L. bifidus* flora in the intestines of nurslings, this bacterium being absent in any considerable numbers from the intestines of infants who are not fed with human milk. Interest in the isolation and determination of the growth requirements of *L. bifidus* has therefore been stimulated by its apparently unique predominance in the intestinal tract of the breast-fed infant.

Extensive research work has been carried out on the identification and isolation of the active biological principle which is responsible for promoting the growth of *L. bifidus* in the intestines of infants who are nourished with human milk, which active principle is evidently not present in sufficient amount to insure the growth of *L. bifidus* as the predominant microorganism in the intestinal tract of infants who are fed with cow's milk, or with any of the usual feeding compositions or infant formulas based on cow's milk. A copending application in which some of us are co-inventors, more fully identified as Serial No. 283,006, filed April 18, 1952, is directed to a process for recovering specific growth-promoting substances for *L. bifidus* from human milk, and to the novel growth-promoting substances thereby recovered. This research has demonstrated that the specific growth-promoting substances or factor is probably also present, at least to some extent, in cow's milk as well as in human milk, but the amount contained in cow's milk is so small as to be only a very small percentage of the amount contained in an equal volume of human milk. It is far insufficient in quantity to provide the infant fed therewith with enough of the growth-promoting substances or factor to insure dominance of the *L. bifidus* microorganism in his colon and feces.

While the concentration of the specific growth promoting factor for *L. bifidus* in cow's milk varies to some extent with various samples of milk, and to some extent with the particular strain or variety of the *L. bifidus* microorganism which is selected for the test, ordinarily the specific growth-promoting factor is present in cow's milk only in about 1/30 the concentration (approximately 3.33%) in which it is present in human or breast milk. This concentration is evidently too low to insure that *L. bifidus* will be the predominating microorganism in the intestinal flora of infants fed with cow's milk. As only about one-half of the solid content of the commercial infant food preparation of which the analysis is given above is cow's milk, the *L. bifidus* growth promoting factor is actually present in such an infant food formula only to the extent of approximately 1/60 (approximately 1.67%) of the amount in which it is present in an equal volume of human milk.

While the advantages of supplying the feeding infant with a food composition suitable for promoting the growth of *L. bifidus* as the predominating microorganism in the infant colon have been appreciated for some time, it has not been possible to attain this with any of the presently available food compositions wherein the specific growth-promoting factor, on the average, has been present only to the extent of approximately 1.67% of the amount in human milk as compared on an equal volume basis. From time to time thought has therefore been given to the possibility of adding to the infant food compositions some material or substance which would supply the specific *L. bifidus* growth-promoting substances or factor in greater amount, so that this growth-promoting factor could be present in the infant's nourishment to an extent sufficient to insure the predominance of the microorganism *L. bifidus* in his intestinal tract. Previously, however, no substance other than human milk has been known to contain the specific growth-promoting substances or factor in sufficiently high concentration to permit increasing the amount of this biologically-active principle to an extent sufficient to insure this result with those preparations currently available, and human milk, of course, is not a practical additive to such formulas.

We have now discovered that the specific growth-promoting factor necessary to support the growth of *Lactobacillus bifidus* in the infant intestinal tract, or at least necessary to support the growth of those strains of the microorganism which have hitherto been known to grow only in the presence of human milk (or the specific growth-promoting substances contained therein) can be supplied by including in the infant food composition a small amount of an organic substance characterized by the presence therein of a residue or radical derived from 2-desoxy-2-acetamino-d-galactose. This compound, also called N-acetyl-d-galactosamine, is represented by the structural formula:

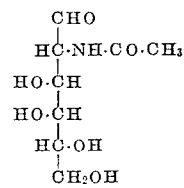

Either 2-desoxy-2-acetamino-d-galactose itself, or any substance capable of yielding this compound by simple cleavage thereof, is useful as a source of the specific growth-promoting activity for *L. bifidus*. Naturally-occurring materials contain the proper configuration of atoms in the N-acetylgalactosamine residue or residues therein to provide the dextro-rotatory form of acetylgalactosamine, which optical isomer seems to be necessary if the material, when incorporated with other nutriments necessary for the growth of the microorganism, will support *L. bifidus* growth.

Among naturally-occurring materials of this class we have found that cartilege, or substances containing N-acetylgalactosamine derived therefrom, possess this specific growth-promoting activity. Chondroitin sulfate, as derived from hogs and other animals, being mostly prepared from the cartilage thereof, is also effective. Other naturally-occurring materials which are effective, both because they contain 2-desoxy-2-acetamino-d-glucose residues as well as 2-desoxy-2-acetamino-d-galactose residues, are the blood group substances, particularly blood groups A, B, and O. There are either conjugated proteins, or contain protein moieties, and are high-molecular and non-dialyzable. Products of partial hydrolysis of these substances with enzymes or with acids, in so far as they still contain acetyl galactosamine residues, are also effective. Total hydrolysis by treatment with acids destroys the activity at the same time also destroying the NH·CO·CH₃ groups. It appears that the presence of one or more of these acetylamino groups is essential, as the elimination of the acetyl group or groups by alkaline hydrolysis destroys the growth-promoting activity of the substance, but this specific biological activity can be restored by reacetylation of the nitrogen of the amino group.

We have found that the amount of N-acetyl-d-galactosamine, or natural substances yielding this acetyl amino sugar upon simple cleavage, that should be incorporated in an infant feeding formula or composition based on or derived from cow's milk of the general type previously described (while, of course, varying to some extent with the material selected), will ordinarily range from about 0.5% to 5.0% by weight, this percentage being based on the total weight of solids present in the infant feeding formula or composition. Frequently an amount of added material not exceeding about 1.0% by weight will be found satisfactory for many purposes in infant feeding.

The addition of N-acetyl-d-galactosamine, or of a natural substance yielding this compound upon simple cleavage, to the infant feeding formula in amounts within the range 0.5% to 5% by weight thereof, based on the solids content basis, supplements the small amount of specific L. bifidus growth-promoting factor already present in that composition as a result of its cow's milk content so that the quantity of the growth-promoting principle, as supplemented, is approximately comparable with the amount occurring on the average in an equal volume of human or breast milk. When the infant is fed with this composition or formula, the protein content thereof being derived from cow's milk, this food being supplemented, however, as to its specific growth-promoting factor by the addition of one or more of the specific additives, all strains or variants of the L. bifidus microorganism present in the infant's intestinal tract have available for their growth in the infant colon a source of nutriment which, as respects the amount of growth-promoting substance, is substantially the same as human milk. The L. bifidus microorganism is thus enabled to grow and proliferate in the intestinal tract of the infant to the same extent and degree that it would were the infant nourished entirely upon human milk.

Various changes and modifications may be made in our invention as described, and to the extent that these changes and modifications are within the scope of the appended claims, they are to be regarded as part of our invention.

We claim:

1. A foodstuff comprising a nutritive composition which is normally deficient in *Lactobacillus bifidus* growth-promoting substances, and an additive selected from the group which consists of N-acetyl-d-galactosamine, cartilage, and chondroitin sulfate.

2. A foodstuff comprising a nutritive composition containing proteins, carbohydrates and fats, but normally deficient in *Lactobacillus bifidus* growth-promoting substances, said foodstuff containing an additive supplying said deficiency, said additive consisting of from 0.5% to 5% by weight, based on the solids content of said foodstuff, of a material selected from the group which consists of N-acetyl-d-galactosamine, cartilage, and chondroitin sulfate.

References Cited in the file of this patent

UNITED STATES PATENTS

| | | |
|---|---|---|
| 1,607,844 | Neilson | Nov. 23, 1926 |
| 2,374,407 | Block et al. | Apr. 24, 1945 |

OTHER REFERENCES

"The Role of Lysozyme in the Development of the Intestinal Flora of the New-Born Infant," by Rosenthal et al., reprinted from the Journal of Infectious Diseases, February, 1931, vol. 48, pages 226–235, American Medical Association Press, 535 North Dearborn Street, Chicago.

"The Enzymes," by Sumner et al., vol. 1, part 2, Academic Press Inc., New York, 1951, pages 772, 785 and 790.